(12) United States Patent
Civiero

(10) Patent No.: US 11,584,477 B2
(45) Date of Patent: Feb. 21, 2023

(54) SUB-ASSEMBLY SPROCKET-CARRYING BODY AND COGSET FOR A BICYCLE REAR WHEEL

(71) Applicant: CAMPAGNOLO S.r.l., Vicenza (IT)

(72) Inventor: Mirco Civiero, Montecchia di Crosara (IT)

(73) Assignee: CAMPAGNOLO S.R.L., Vicenza (IT)

( * ) Notice: Subject to any disclaimer, the term of this patent is extended or adjusted under 35 U.S.C. 154(b) by 295 days.

(21) Appl. No.: 16/937,274

(22) Filed: Jul. 23, 2020

(65) Prior Publication Data
US 2021/0031875 A1 Feb. 4, 2021

(30) Foreign Application Priority Data
Jul. 30, 2019 (IT) .................. 102019000013341

(51) Int. Cl.
*B62M 9/10* (2006.01)
*F16H 55/30* (2006.01)

(52) U.S. Cl.
CPC ............... *B62M 9/10* (2013.01); *F16H 55/30* (2013.01)

(58) Field of Classification Search
CPC ................................. B62M 9/10; F16H 55/30
USPC ........................................................ 474/160
See application file for complete search history.

(56) References Cited

U.S. PATENT DOCUMENTS

| 5,954,604 | A | 9/1999 | Nakamura | |
|---|---|---|---|---|
| 8,454,461 | B2 * | 6/2013 | Valle | F16H 9/06 474/69 |
| 2017/0233037 | A1 * | 8/2017 | Hara | B62M 9/14 474/78 |
| 2018/0237103 | A1 | 8/2018 | Fujita et al. | |
| 2018/0290711 | A1 * | 10/2018 | Tokuyama | B62M 9/10 |
| 2019/0127022 | A1 * | 5/2019 | Komatsu | F16H 55/30 |

FOREIGN PATENT DOCUMENTS

| EP | 1 342 657 A2 | 9/2003 | |
|---|---|---|---|
| EP | 2 022 712 A2 | 2/2009 | |
| EP | 2 574 539 A2 | 4/2013 | |
| EP | 2 987 715 A1 | 2/2016 | |
| EP | 2987715 A1 * | 2/2016 | ............. B62M 9/10 |

OTHER PUBLICATIONS

European Search Report for European Application No. 20187792.5, dated Nov. 30, 2020.

* cited by examiner

*Primary Examiner* — Gene O Crawford
*Assistant Examiner* — Emily R Kincaid
(74) *Attorney, Agent, or Firm* — Volpe Koenig

(57) ABSTRACT

A sub-assembly is presented, for a bicycle rear wheel, formed by a sprocket-carrying body and a cogset mounted coaxially on the sprocket-carrying body through shape engagement, is sized such that a good compromise is obtained between the ability to house a relatively large number of sprockets and the structural solidity of the sub-assembly.

10 Claims, 2 Drawing Sheets

SUB-ASSEMBLY SPROCKET-CARRYING BODY AND COGSET FOR A BICYCLE REAR WHEEL

CROSS REFERENCE TO RELATED APPLICATION

This application claims the benefit of Italian Application No. 102019000013341, filed on Jul. 30, 2019, which is incorporated herein by reference as if fully set forth.

FIELD OF INVENTION

The present invention relates to a sub-assembly for a bicycle rear wheel, formed by a sprocket-carrying body and a cogset mounted coaxially on the sprocket-carrying body through shape engagement of the cogset on a coupling profile formed on the radially peripheral surface of the sprocket-carrying body and extending in the axial direction.

BACKGROUND

In the entire present description and in the claims, the spatial indications, such as in particular those of radial, axial, circumferential direction, will be given with reference to the rotation axis of the rear wheel of the bicycle, which coincides with the axis of the cogset, of the sprocket-carrying body, of the hub of the wheel and in general of all of the elements that rotate with the wheel. Moreover, the axial direction will be indicated as towards the outside if directed away from the longitudinal mid-plane of the bicycle or away from the hub of the wheel, and vice-versa it will be indicated as towards the inside if directed towards such a mid-plane or towards the hub. The brief indications outer and inner (or axially outer and axially inner) will be used in the same way: outer is thus equivalent to facing in the outer axial direction and inner is equivalent to facing in the inner axial direction.

In order to mount a cogset on the hub of a rear bicycle wheel a so-called sprocket-carrying body is normally used, which on one side is made to rotate as a unit with the sprockets through shape coupling, and on the other side is made to rotate as a unit—however in a unidirectional manner—with the hub through a set of ratchets or similar, commonly called free wheel. In this way, the transmission chain engaged with the various sprockets is capable of transmitting a torque to the hub in the advancing direction of the bicycle.

The sprocket-carrying body essentially consists of a tubular body, that is mechanically coupled at the radially peripheral surface thereof with central mounting openings made in the sprockets. The radially peripheral surface of the sprocket-carrying body is configured with a coupling profile (often formed by substantially axial ribs and grooves, alternating in the circumferential direction), adapted for allowing the aforementioned shape coupling. For this purpose, the central mounting openings of the sprockets are provided with extensions or projections directed radially towards the rotation axis which couple with the coupling profile present on the sprocket-carrying body.

The sprockets are thus mounted axially on the sprocket-carrying body in succession, from the sprocket of largest diameter, so that when the sprocket-carrying body is mounted on the hub of the wheel of the bicycle the sprockets of largest diameter are towards the inside, i.e. close to the rear wheel, whereas the sprockets of smaller diameter are towards the outside.

In more modern bicycle gearshifts, particularly for bicycles intended for racing, there is a well-known tendency to increase the number of sprockets. When a cogset reaches 11, 12 or even more sprockets, it may be possible to do without the front gearshift; this simplifies and lightens the bicycle, which is undoubtedly advantageous to the cyclist provided that this is not accompanied by a penalization in the availability of gear ratios.

In order to have greater axial lengths available for the sprockets, often solutions are used in which the cogset has a greater axial extension with respect to the sprocket-carrying body, i.e. overhanging, towards the inside and/or towards the outside. This condition, however, determines a very inhomogeneous distribution of the stresses due to the transmission of torque from the cogset to the sprocket-carrying body, thus subjecting the material both of the sprocket-carrying body and of the cogset (in extreme cases also of the hub) to greater stresses. Consequently, there is the risk that deformations occur such as to disturb the regularity of operation, or even that there is structural yielding of some parts.

SUMMARY

The problem at the basis of the present invention is therefore to find the best compromise conditions, which makes it possible to limit the risks of yielding or excessive deformation when the cogset is overhanging with respect to the sprocket-carrying body. This compromise is achieved by the adimensional calculation set forth below that produces an index of the structural solidity of the sub-assembly.

BRIEF DESCRIPTION OF THE DRAWINGS

The features and advantages of the invention will become clearer from the following description of a preferred embodiment thereof, made with reference to the attached drawings. In such drawings.

DETAILED DESCRIPTION OF THE PREFERRED EMBODIMENTS

Figure 1:
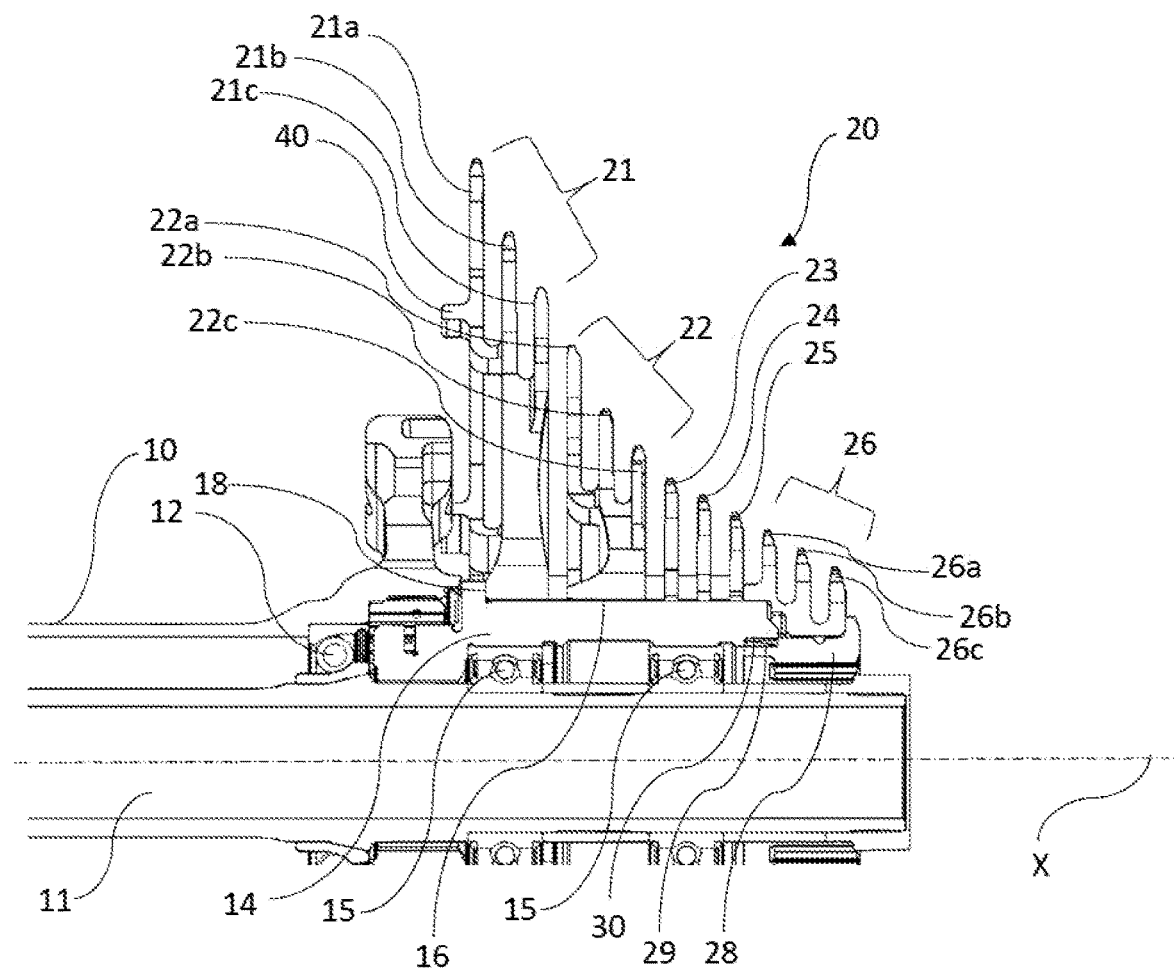
FIG. 1 is a section view of a hub of a rear wheel of a bicycle with a sub-assembly according to the invention.

The invention relates to a sub-assembly for a bicycle rear wheel, comprising a sprocket-carrying body and a cogset mounted coaxially on the sprocket-carrying body through shape engagement of the cogset on a coupling profile formed on the radially peripheral surface of the sprocket-carrying body and extending in the axial direction; the following transversal planes are defined in the sub-assembly, perpendicular to the common axis of the sprocket-carrying body and of the cogset:

abutment plane of the sprocket-carrying body: plane at the axial abutment position of the cogset on the sprocket-carrying body;

outer bulk plane of the sprocket-carrying body: plane at the end of the sprocket-carrying body opposite to the abutment plane;

outer bulk plane of the cogset: plane at the outer face of the smallest sprocket, facing the opposite way with respect to the cogset;

inner bulk plane of the cogset: plane at the inner face of the largest sprocket, facing the opposite way with respect to the cogset.

It should be noted that the bulk planes defined here refer to the faces of the sprockets and therefore possible projections present in various ways on such faces are not taken into consideration.

When the cogset is mounted on the sprocket-carrying body, the following lengths are defined, in the axial direction:

Lc: length of the sprocket-carrying body, between the outer bulk plane and the abutment plane;

Ls: axial length of the coupling profile on the sprocket-carrying body;

Lp: length of the cogset, between the outer bulk plane and the inner bulk plane;

Sint: inner overhang, equal to the distance between the abutment plane of the sprocket-carrying body and the inner bulk plane of the cogset, positive if the first is outside the second;

Sest: outer overhang, equal to the distance between the outer bulk plane of the sprocket-carrying body and the outer bulk plane of the cogset, positive if the first is inside the second.

According to the invention, the following adimensional indices are calculated:

$$P1 = Ls/Lp$$

$$P2 = Lc/(Sint + Sest)$$

$$K = P1 * P2$$

The index P1 provides an indication of the transmission capability of the torque between cogset and sprocket-carrying body. For a conventional sub-assembly, wherein the cogset has substantially the same axial extension as the sprocket-carrying body, the index P1 is equal to 1 and there is a somehow "normal" torque transmission capability; differently, if the coupling profile (which is the element through which the torque passes from the cogset to the sprocket-carrying body) extends axially less than the cogset, the value of P1 goes down. In general, the lower P1, the more the transmission of torque between the cogset and the sprocket-carrying body occurs in an irregular and non-uniform manner.

The index P2 provides an indication of the rigidity of the sub-assembly. For a conventional sub-assembly, without overhangs of the cogset with respect to the sprocket-carrying body, the index P2 tends to infinity and there is somehow "normal" rigidity of the sub-assembly; differently, in the presence of overhangs and therefore of portions of cogset not in direct engagement on the sprocket-carrying body, the value of P2 goes down. In general, the lower P2, the lower the rigidity of the sub-assembly.

The index K, i.e. the product between the two indices P1 and P2, provides an overall indication of the structural solidity of the sub-assembly. Very high values indicate sub-assemblies that are rigid and with high torque transmission capability; as K decreases, the structural solidity of the sub-assembly decreases.

Conversely, however, the ability to house a large number of sprockets increases as K decreases.

It has been found that a good compromise, i.e. the ability to house a relatively large number of sprockets without for this reason excessively penalizing the structural solidity of the sub-assembly, is obtained when K is comprised between 2 and 6.

Preferably, K is comprised between 2 and 4, more preferably between 2 and 3, even more preferably between 2.2 and 2.8.

Preferably, Ls is comprised between 25 and 34 mm, more preferably between 28 and 33 mm, even more preferably between 31 and 32 mm. Indeed, high values of Ls mean greater ability to transmit torque in a regular and well-distributed manner, but they also mean a greater axial bulk; the indicated values have been verified as a good compromise.

Preferably, Sest is comprised between 7 and 8 mm. High values of Sest mean more space in the axial direction to house (grouped in monolithic groups or fixed in another way) sprockets of too small diameter to be able to be slotted onto the sprocket-carrying body; however, the greater Sest, the greater the irregularity of transmission of torque.

Preferably, Sest/Sint is comprised between 2 and 4.5. Indeed, it has been observed that a certain unbalancing of the overhangs, with Sest greater than Sint, promotes a better distribution of stresses, provided that this unbalancing is not excessive.

The coupling profile can be of various types; however, it preferably comprises grooves arranged in the axial direction on the radially peripheral surface of the sprocket-carrying body.

FIG. 1 represents a hub 10 of a hub group of a bicycle rear wheel (not shown), mounted coaxially on an axle 11, by means of bearings 12; the hub 10 is thus free to rotate on the axle 11, whereas the latter is intended to be mounted fixed on the frame of the bicycle.

The hub 10 is coupled with a sprocket-carrying body 14, through a freewheel mechanism (not highlighted) that ensures that the hub 10 is set in rotation by the sprocket-carrying body 14 only in the direction that determines an advancing of the bicycle, not in the opposite direction. The sprocket-carrying body 14 has an approximately tubular shape and is mounted free on the axle 11, by means of bearings 15. The sprocket-carrying body 14 is provided on its radially peripheral surface with a coupling profile formed by grooves 16 arranged in the axial direction. Moreover, the sprocket-carrying body 14 is provided close to the axially inner end thereof, with an end stop 18, in the form of teeth projecting in the radial direction from the sprocket-carrying body 14; alternatively, a flange extending along the entire circumference of the sprocket-carrying body 14 may be provided as an end stop 18 instead of the teeth.

A cogset 20 is mounted on the sprocket-carrying body 14. The cogset 20 illustrated comprises 12 sprockets organized from the largest to the smallest as follows: the first three sprockets 21a, 21b, 21c are made as a unit with each other to form a monolithic group (or triplet) 21; the next three sprockets 22a, 22b, 22c are made as a unit with each other to form a monolithic group (or triplet) 22; the next three sprockets 23, 24, 25 are independent from one another; the last three sprockets 26a, 26b, 26c are made as a unit with each other to form a monolithic group (or triplet) 26. These elements are mounted peripherally on the sprocket-carrying body 14, with the triplet 21 rested axially on the end stop 18, the triplet 22 rested axially on the triplet 21, the sprocket 23 rested axially on the triplet 22, the sprocket 24 rested axially on the sprocket 23, the sprocket 25 rested axially on the sprocket 24, the triplet 26 rested axially on the sprocket 25.

The triplets 21, 22 and 26 and the sprockets 23-25 are slotted onto the sprocket-carrying body 14, constrained in rotation to the sprocket-carrying body 14 by means of the grooves 16 but substantially free in the axial direction. Towards the inside in the axial direction (i.e. towards the hub 10), the triplets 21, 22 and 26 and the sprockets 23-25 are held by the end stop 18; towards the outside in the axial direction, the triplets 21, 22 and 26 and the sprockets 23-25 are held by a ring nut 28, inserted on the axle 11 and screwed to the sprocket-carrying body 14, by means of an outer threaded portion 29 of the ring nut 28 and an inner threaded portion 30 of the sprocket-carrying body 14. The tightening of the ring nut 28 ensures that all of the triplets 21, 22 and 26 and the sprockets 23-25 are locked on the sprocket-carrying body 14.

As stated, 12 sprockets, single or grouped in triplets, are mounted in this hub group 1. In particular, there is a very small sprocket, the sprocket 26c, which has a number of teeth that is so low that it cannot be mounted on the sprocket-carrying body 14 without the provision of having grouped it in the triplet 26. Indeed, if this small sprocket were single, it would be too small to be able to be slotted onto the sprocket-carrying body 14; the triplet 26 on the other hand can have an inner axial portion at the tooth 26a (which has 12 teeth) of dimensions such as to be able to engage on the sprocket-carrying body 14.

Figure 2:
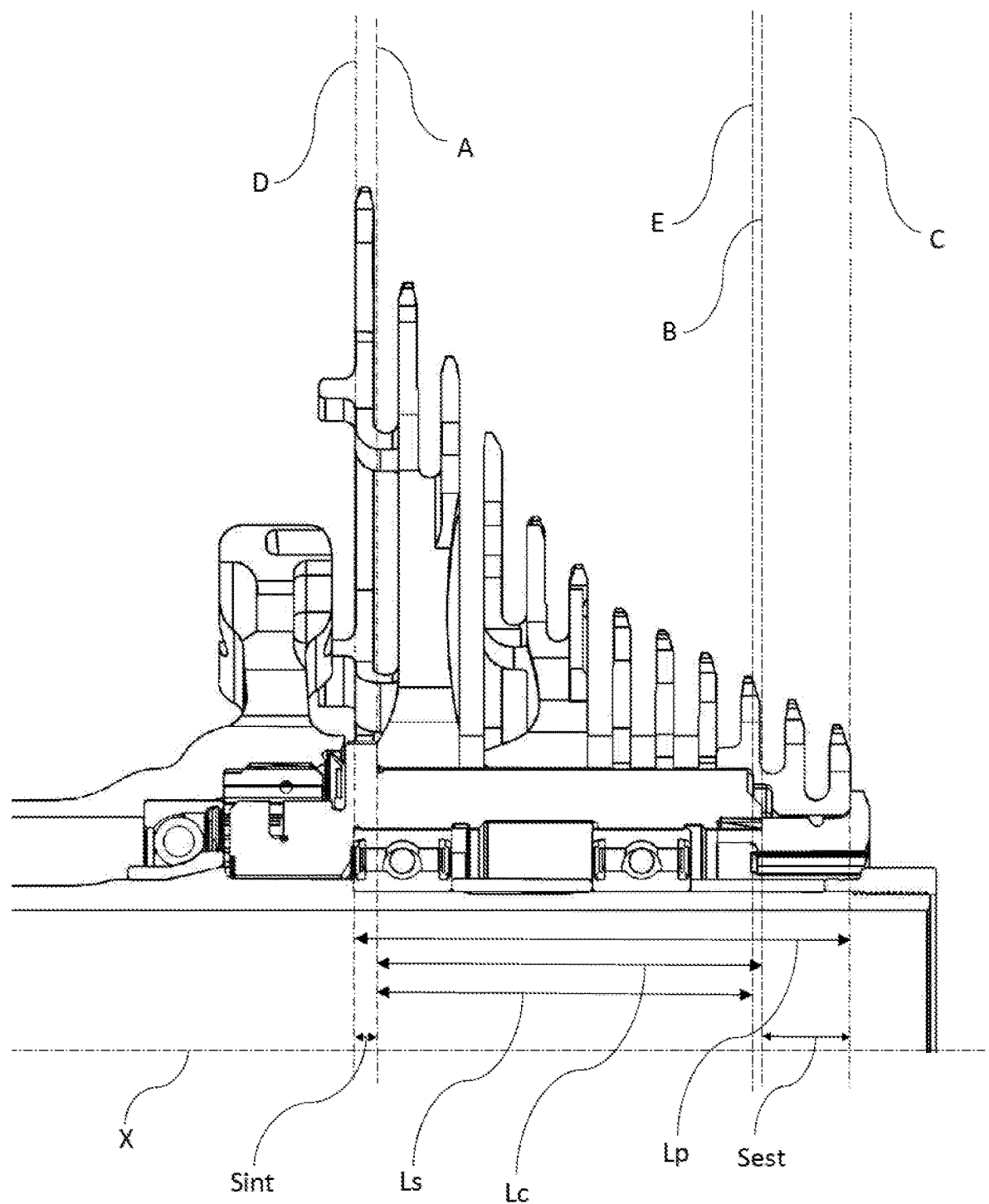
FIG. 2 is a section view of the same hub of FIG. 1, with slightly enlarged scale and without the reference numerals, in which some characteristic lengths and planes are highlighted.

As can be seen better in FIG. 2, where the reference numerals given in FIG. 1 have been omitted precisely in order to have better visibility, it is possible to identify in the sub-assembly formed by the sprocket-carrying body 14 and the cogset 20 some characteristic planes, in particular the following, all perpendicular to the rotation axis X of the hub 10:

abutment plane A of the sprocket-carrying body 14: it is the plane at the axial abutment position of the cogset 20 on the sprocket-carrying body 14, as defined by the end stop 18;

outer bulk plane B of the sprocket-carrying body 14: it is the plane at the axially outer end of the sprocket-carrying body 14, opposite the abutment plane A;

outer bulk plane C of the cogset 14: it is the plane at the axially outer face of the smallest sprocket 26c, thus facing the opposite way with respect to the cogset 20;

inner bulk plane D of the cogset 14: it is the plane at the axially inner face of the largest sprocket 21a, thus facing the opposite way with respect to the cogset 20;

limiting plane of the coupling profile E: it is the plane at the axially outer limit of the coupling profile 16; the latter can indeed have a shorter axial extension towards the outside with respect to the sprocket-carrying body 14, even a little one, like in the example illustrated in the Figures.

It should be noted that identifying the plane C and the plane D is independent from the possible presence on the faces of the sprockets 21a or 26c of projections or protuberances, like for example those indicated with 40 on the sprocket 21a: these planes only take into account the effective thickness of the sprocket, i.e. the thickness of the teeth thereof.

Between these planes, moreover, the following distances are defined:

length Lc of the sprocket-carrying body 14: it is the distance between the outer bulk plane B and the abutment plane A;

axial length Ls of the coupling profile 16 on the sprocket-carrying body 14: it is also the distance between the abutment plane A and the limiting plane of the coupling profile E;

length Lp of the cogset 20: it is the distance between the outer bulk plane C and the inner bulk plane D of the cogset 20;

inner overhang Sint: it is the distance between the abutment plane A of the sprocket-carrying body 14 and the inner bulk plane D of the cogset 20; it is positive if plane A is axially outer with respect to the plane D (as shown in FIG. 2);

outer overhang Sest: it is the distance between the outer bulk plane B of the sprocket-carrying body 14 and the outer bulk plane C of the cogset; it is positive if the plane B is axially inner with respect to the plane C.

According to the invention, the following adimensional indices are also defined:

$P1 = Ls/Lp$ $P2 = Lc/(Sint + Sest)$ $K = P1 * P2$

In order to ensure the best compromise between the ability to house a relatively large number of sprockets and the structural solidity of the sub-assembly, according to the invention K must be comprised between 2 and 6, preferably between 2 and 4, more preferably between 2 and 3, and even more preferably between 2.2 and 2.8.

Moreover, according to the invention, it is preferred for Ls to be comprised between 25 and 34 mm, preferably between 28 and 33 mm, more preferably between 31 and 32 mm; for Sest to be comprised between 7 and 8 mm; and for Sest/Sint to be comprised between 2 and 4.5.

What is claimed is:

1. A sub-assembly for a bicycle rear wheel, the sub-assembly comprising a sprocket-carrying body (14) and a cogset (20) mounted coaxially on the sprocket-carrying body (14) through shape engagement of the cogset (20) on a coupling profile (16) formed on a radially peripheral surface of the sprocket-carrying body (14) and extending in an axial direction, wherein transversal planes A, B, C, and D are defined perpendicular to a common axis (X) of the sprocket-carrying body and of the cogset:

plane A is a plane of the sprocket-carrying body (14) at an axial abutment position of the cogset (20) on the sprocket-carrying body (14);

plane B is a plane at an axially outer bulk end of the sprocket-carrying body (14) opposite to the plane A;

plane C is a plane at an axially outer bulk face of the smallest sprocket (26c) of the cogset (20) that faces away from the cogset (20);

plane D is a plane at an axially inner bulk face of the largest sprocket (21a) of the cogset (20) that faces away from the cogset (20);

wherein mounting the cogset (20) on the sprocket-carrying body (14) results in the defined following lengths along the common axis (X):

Lc is a length of the sprocket-carrying body (14) between the plane B and the plane A;

Ls is an axial length of the coupling profile (16) on the sprocket-carrying body (14);

Lp is a length of the cogset (20) between the plane C and the plane D;

Sint is an inner overhang equal to a distance between the plane A of the sprocket-carrying body (14) and the plane D of the cogset (20) that is positive when plane A is axially outside of plane B;

Sest is an outer overhang equal to a distance between the plane B of the sprocket-carrying body (14) and the plane C of the cogset (20) that is positive when plane B is axially inside of plane C;

and wherein adimensional indices are defined according to the following:

$$P1 = Ls/Lp$$

$$P2 = Lc/(Sint + Sest)$$

$$K = P1 * P2$$

where K depicts a rigidity of the sub-assembly and is in a range between 2 and 6.

2. The sub-assembly according to claim 1, wherein K is in a range between 2 and 4.

3. The sub-assembly according to claim 1, wherein K is in a range between 2 and 3.

4. The sub-assembly according to claim 1, wherein K is in a range between 2.2 and 2.8.

5. The sub-assembly according to claim 1, wherein Ls is in a range between 25 mm and 34 mm.

6. The sub-assembly according to claim 1, wherein Ls is in a range between 28 mm and 33 mm.

7. The sub-assembly according to claim 1, wherein Ls is in a range between 31 mm and 32 mm.

8. The sub-assembly according to claim 1, wherein Sest is in a range between 7 mm and 8 mm.

9. The sub-assembly according to claim 1, wherein Sest/Sint is in a range between 2 and 4.5.

10. The sub-assembly according to claim 1, wherein the coupling profile is comprised of grooves (16) arranged in the axial direction on the radially peripheral surface of the sprocket-carrying body (14).

\* \* \* \* \*